United States Patent [19]

Nakamura et al.

[11] Patent Number: 5,211,501
[45] Date of Patent: May 18, 1993

[54] ROBOT ARM COUPLING APPARATUS

[75] Inventors: Yoshitaka Nakamura; Mikio Tsutsumi, both of Kobe, Japan

[73] Assignee: BL Autotec, Ltd., Kobe, Japan

[21] Appl. No.: 719,708

[22] Filed: Jun. 26, 1991

[30] Foreign Application Priority Data

Jun. 28, 1990 [JP] Japan ................................ 2-172284

[51] Int. Cl.⁵ .............................................. B25G 3/18
[52] U.S. Cl. ..................................... 403/322; 403/328
[58] Field of Search ................................ 403/322, 328

[56] References Cited

U.S. PATENT DOCUMENTS

| 4,636,135 | 1/1987 | Bancon | 403/322 X |
| 4,696,524 | 9/1987 | Cloyd . | |
| 4,793,053 | 12/1988 | Zuccaro et al. | 403/328 X |
| 4,815,780 | 3/1989 | Obrist | 403/322 X |
| 4,906,123 | 3/1990 | Weskamp et al. | 403/322 |
| 5,002,500 | 3/1992 | Zuccaro et al. . | |

FOREIGN PATENT DOCUMENTS 0288148 10/1988 European Pat. Off. .
0301711 2/1989 European Pat. Off. .
3347423 7/1985 Fed. Rep. of Germany .
3705123 9/1988 Fed. Rep. of Germany .

Primary Examiner—Andrew V. Kundrat
Attorney, Agent, or Firm—Sixbey, Friedman, Leedom & Ferguson

[57] ABSTRACT

A robot arm coupling apparatus. This apparatus has an inner assembly attached to a robot arm, an outer assembly to which a tool or the like is attached and a locking means to lock both assemblies to each other. Said locking means comprises a piston member supported by the inner assembly slidably between the locking position and the unlocking position, a plurality of ball members surrounding said piston member and supported by the inner assembly, and a ball retainer which is provided at the outer assembly, which is contactable at its tapered surface with the ball member and holds both assemblies together, when the piston member moves to the locking position, in cooperation with the ball member. The working surface of the piston member including first and second tapered surfaces and at least an axially extending cylindrical surface.

3 Claims, 1 Drawing Sheet

ROBOT ARM COUPLING APPARATUS

BACKGROUND OF THE INVENTION

1. Field of the Invention

This invention relates to a robot arm coupling apparatus, and more particularly, to a coupling apparatus for quickly connecting and disconnecting a tool or the like to and from a robot arm.

Generally, a coupling apparatus having an inner assembly attached to a robot arm, an outer assembly to which a tool or the like is attached and locking means which locks the outer assembly to the inner assembly has been known as a coupling apparatus for connecting and disconnecting a tool or the like to and from a robot arm. For example, U.S. Pat. No. 4,696,524 discloses such coupling apparatus having locking means comprising a piston member supported by the inner assembly slidably between the locking position and the unlocking position, a plurality of ball member surrounding said piston member and supported by the inner assembly and a ball retainer supported by the outer assembly and contractable with said ball member of the outer assembly at the tapered surface which, when the piston member moves to the locking position, connects and supports both assemblies in cooperation with the ball member. According to this apparatus, when the piston member moves to the locking position, the ball member pushes upwardly the outer assembly through the medium of the tapered surface, whereby the inner assembly and the outer assembly are locked to each other.

In the above coupling apparatus, however, when the piston member is in the locking position, a cylindrical surface extending in parallel with a sliding direction of the piston member makes contact with the ball member and therefore if there are processing irregularities for the inner assembly, the outer assembly, etc., the ball member cannot be moved exactly to the locking position. Thus, in locking the inner assembly and the outer assembly to each other, there is a fear that the contact surfaces of both assemblies do not mate exactly with each other.

SUMMARY OF THE INVENTION

An object of the present invention is to improve the above robot arm coupling apparatus so as to improve reproducibility of the locking position by eliminating a gap between the contact surfaces of both assemblies in locking. Another object of the present invention is to provide a robot arm coupling apparatus by which locking and unlocking of the inner assembly and outer assembly can be carried out accurately, free from spontaneous separation between the inner assembly and the outer assembly.

In order to attain the above objects, a robot arm coupling apparatus according to the present invention comprises an inner assembly attached to the robot arm, an outer assembly to which a tool or the like is attached and locking means to lock the above both assemblies to each other. Said locking means has a piston member which is supported by the inner assembly and is slidable between the locking position and the unlocking position, a plurality of ball members surrounding said piston member and supported by the inner assembly and a ball retainer which is arranged at the outer assembly, is contactable with said ball member at the tapered surface and connects and supports both assemblies in cooperation with the ball member when the piston member moves to the locking position. The surface at which the piston member connects the ball member is, at least a part thereof, the first tapered surface.

Therefore, when the piston member moves to the locking position, the piston member presses the ball member through the medium of the first tapered surface and due to the wedging effect by the tapered surface, the ball member is pressed and urged outwardly in radial direction. Then, the ball member pushes and urges the outer assembly upwardly through the medium of the tapered surface, namely, toward the inner assembly side and thus both assemblies are locked to each other, with no gap therbetween. Since balls are pushed outwardly in radial direction by the tapered surface of the piston, processing errors are absorbed and locking of both assemblies is done accurately, with no gap occurring at the contact surface of both assemblies, namely, reproducibility of locking position is improved.

In the present invention, the contact surface of the piston member with the ball member has a cylindrical surface connected to the underside of the first tapered surface. Therefore, even if the piston member is not supported at the specified postion and the ball member is displaced to the inner side in radial direction and lifts up the piston member, separation between the inner assembly and the outer assembly is restricted because the cylindrical surface is connected to the underside of the tapered surface and at that part force of the ball member to lift up the piston member is rendered ineffective.

In the present invention, the cylindrical surface of the piston member is connected at its underside to the second tapered surface and the angle of inclination of the first tapered surface to the perpendicular axis is made smaller than the angle of inclination of the second tapered surface to the perpendicular axis. In this case, for example, while the angle of inclination of the first tapered surface to the perpendicular axis is about 15°, that of the second tapered surface to the perpendicular axis is about 30°. The larger angle of inclination of the second tapered surface than the first tapered surface makes it possible to displace the ball member to a large extent outwardly in radial direction by comparatively few strokes at locking of the inner assembly and the outer assembly to each other. As the angle of inclination of the first tapered surface to the perpendicular axis is made smaller, wedging effect by the first tapered surface increases and the state of locking can be maintained accurately even against the sudden movement of the robot arm.

In the present invention, the piston member comprises three parts, namely, the first part of large diameter, the second part of large diameter having a tapered surface which is a contact surface with the ball member and the third part of small diameter which connects the first part to the second part. This structure of the piston member provides a larger area where pressure applied to the piston at its rising is received and therefore it is possible to drive the piston by large force and driving is made rapid and accurate. More particularly, by making pressurized air, for example, act on the upper and the lower surfaces of the first part of large diameter of the piston member, the vertical motion of the piston member, namely, locking and unlocking of both assemblies, can be carried out accurately.

The above and other objects and novel features of the present invention will be understood more clearly by reading the following description with reference to the accompanying drawings.

BRIEF DESCRIPTION OF THE DRAWINGS

The attached drawings show a preferred embodiment of the present invention, in which.

DETAILED DESCRIPTION OF THE INVENTION

A description is made below of a preferred embodiment of the present invention, with reference to the accompanying drawings.

Figure 1:
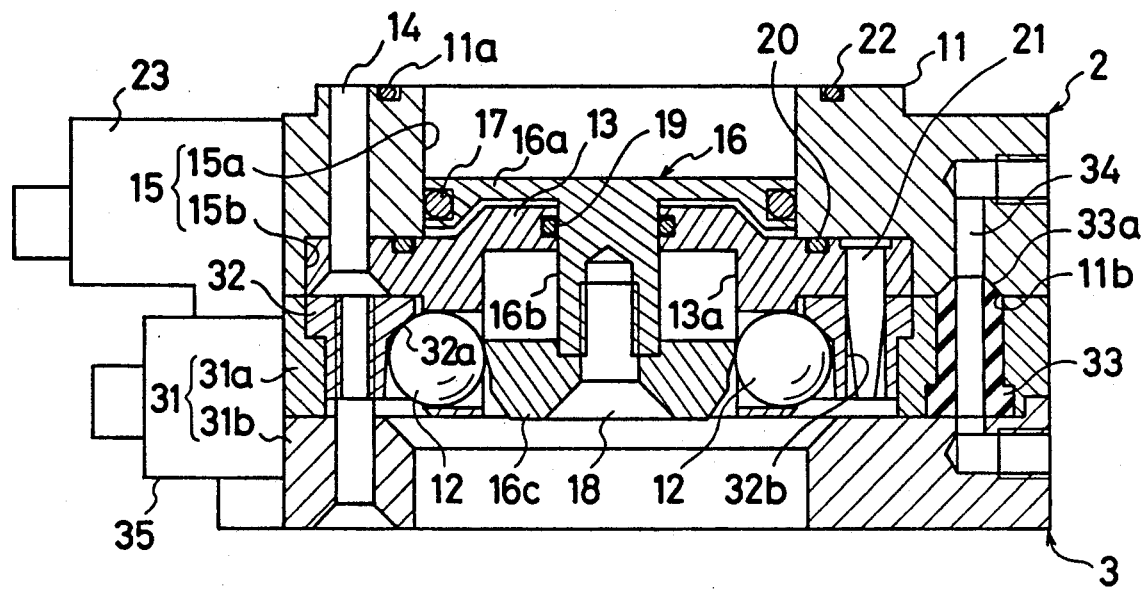
FIG. 1 is a longitudinal section, showing the state in which the inner assembly and the outer assembly are connected to each other.
Figure 2:
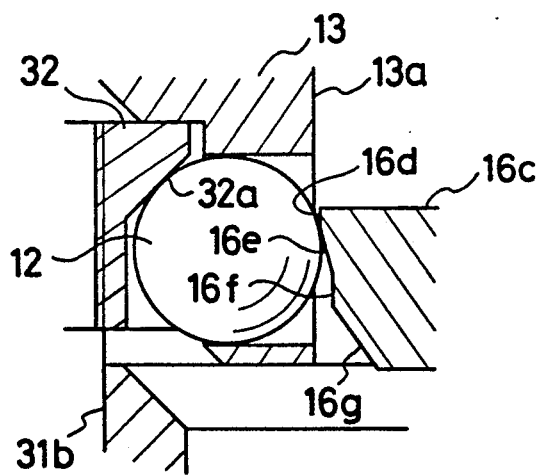
FIG. 2 shows a main part of the apparatus according to the present invention, on an enlarged scale.

In FIG. 1 showing the robot arm coupling apparatus in a locked state, reference numeral 1 designates a robot arm coupling apparatus which is provided with an inner assembly 2 to be connected to a robot arm (not shown in the drawing) and an outer assembly 3 to which a tool or the like is attached. Both assemblies 2, 3 are so composed that they are quickly connected or disconnected.

In the inner assembly 2, a master cylinder 13 which supports four balls (steel balls) is connected to a master body 11 by a screw 14. A hole 15 of a small diameter 15a and a large diameter 15b connected coaxially is made in the master body 11. A piston 16 is put slidably through the small diameter 15a of the hole 15. More particularly, the piston 16 is provided with a piston main body 16a which is slidably positioned in the small diameter 15a of hole 15 includes a sealing material (O-ring) 17, an axial part 16b which is connected at its one end to the piston main body 16a and passes through the master cylinder 13 and a ball driving part 16c which is connected to the other end portion of the axial part 16b by a screw 18 and pushes a ball 12 outwardly in radial direction. With this arrangement, the piston 16 may be reciprocated in an up and down direction under by pressurized air thus functioning as a reciprocating cam which reciprocates the ball 12 in radial direction. A seal material 19 and a seal material 20 are provided between the master cylinder 13 and the axial part 16b and between the master cylinder 13 and the master body 11 respectively. A locating pin 21 is attached to the master cylinder 13, passing through the master cylinder 13 and extending downwardly. Although not shown concretely in the drawing, the ball 12 is prevented from slipping out of the master cylinder 13 by a leaf spring provided at the outer circumferential surface of the master cylinder 13.

A annular groove 11a in which a seal material 22 is put is made at the upper surface of the master body 11 and a master connector 23 is provided at the side of the master body 11.

The ball driving part 16c is provided with a cylindrical part 16d of large diameter which slides in a circular concave part 13a of the master cylinder 13, a tapered cone part 16e which composes the first tapered surface with one end thereof connected to the cylindrical part 16d and whose diameter becomes smaller toward the other end portion thereof, a cylindrical part 16f of small diameter connected to the other end portion of the tapered part 16e and a tapered part 16g which composes the second tapered surface connected to the cylindrical part 16f of small diameter. The angle of inclination of the tapered cone part 16e to the perpendicular axis (hereinafter referred to as "angle of inclination of the tapered cone part") may be the same as the angle of inclination of the tapered part 16g to the perpendicular axis (hereinafter referred to as "the angle of inclination of the tapered part 16g") but in order to increase wedging effect by the tapered cone part (to be described later) and to maintain the locked state accurately against the sudden movement of the robot arm, in this embodiment it is so designed that the angle of inclination of the tapered cone part 16e is smaller than that of the tapered part 16g. Concretely, in this embodiment the angle of inclination of the tapered cone part 16e is 15° and the angle of inclination of the tapered part 16g is 35°.

The outer assembly 3 is provided with a tool body 31 comprising an upper side member 31a and a lower side member 31b and a ball retainer 32 which makes contact with the ball 12. The ball retainer 32 is annular. Formed at the inner circumferential surface of the ball retainer 32 is a tapered surface 32a which makes contact with the ball 12. A locating hole 32b in which a locating pin 21 on the side of the inner assembly 2 is fitted is also made.

Attached to the upper side member 31a of the tool body 31 is a rubber bushing 33 whose top end tapered part 33a projects upwardly. When both assemblies 2, 3 are locked to each other, the top end tapered part 33a is fitted in the concave part 11b of the master body 11, whereby an air passage 34 in which the air for controlling the tool flows is formed.

Reference numeral 35 designates a tool connecter which is connected electrically to the master connecter 23 when both assemblies 2, 3 are locked to each other. By this electrical connection, an electrical control system for controlling the tool is composed.

Under the above composition, action similar to the case of the conventional apparatus (refer to the specification and drawings of U.S. Pat. No. 4,696,524) is done but in locking the inner assembly to the outer assembly, when pressurized air acts on the upper surface of the piston 16 (piston main body 16a) through an air passage (not shown in the drawing) formed in the master body 11, the piston 16 lowers and makes contact with the inner side of the ball 12 because of the angle of inclination of the second tapered surface (tapered part 16g) of the ball driving part 16c being large, displacing the ball 12 outwardly in the radial direction by moving the piston 16 in an up and down direction. Then, the outer circumferential surface of the ball 12 is pressed by the first tapered surface (tapered cone part 16e) and due to the so-called wedging effect by the first tapered surface, the ball 12 is moved outwardly in radial direction until it is put in the specified position where it makes contact with the tapered surface 32a. In this case, since the angle of inclination of the tapered cone part 16e is set small, wedging effect by the tapered cone part 16e is increased.

Therefore, the outer assembly 3 is urged to rise by pressing force applied to the tapered surface 32a of the ball retainer 32 from the ball 12 and is moved until a connecting end surface at the upper side of the outer assembly 3 makes contact with the connecting end surface at the under side of the inner assembly 2. Thus, even if a gap occurs between both assemblies due to processing irregularity, such irregularity is absorbed by displacing the outer assembly 3 upwardly by positively pressing the ball outwardly in radial direction by the tapered surface of the ball driving part 16c. As a result, both assemblies are always locked to each other with no gap therebetween, namely, reproducibility of the locking position is improved and the electrical connecting point of the connecters 23, 35 is also improved.

During use of the tool pressurized air acts on the piston 16, however, if pressurized air ceases to act on the upper surface of the piston 16, the ball is displaced inwardly in radial direction by weight of the outer assembly 3 including the tool and thus the piston 16 is raised. Once the ball 12 contacts the cylindrical surface (cylindrical part of small diameter 16f) connected to the underside of the first tapered surface (tapered cone part 16e), the force of raising the piston 16 by the ball 12 is rendered ineffective such that the piston 16 stops raising and spontaneous separation of the assembly is restricted.

In the case where it is desired to disconnected the assembly pressurized air is applied to the underside of the piston main body 16a through an air passage (not shown in the drawing) formed at the master body 11 so as to raise the piston 16, whereby the ball 12 moves inwardly in radial direction and connection of the assembly is released. At this time, since the axis part 16b of small diameter is connected to the underside of the piston main body 16a of large diameter, a larger pressure receiving area can be obtained at the undersurface of the piston main body 16a which causes pressurized air to act when the piston 16 is raised and therefore raising of the piston 16 can be done by large force as in the case of lowering the piston 16.

As the present invention can be embodied in various forms, without departing from its substantial characteristics, the above embodiment has been given solely for explanation purposes and is not of restrictive nature. Furthermore, as the scope of the present invention is not limited by the description made preceding the claim for patent but is limited by the scope of claim for patent, any change in the requirements of the scope of claims for patent and equivalent to such requirements are included in the scope of claim for patent.

What is claimed is.

1. A coupling apparatus comprising:

an inner assembly capable of being attached to a drive body;

an outer assembly to which a component is attached; and a locking means for locking said inner assembly to said outer assembly; said locking means including;

a piston member slidably supported by said inner assembly, said piston member being slidable between a locking position and an unlocking position;

a plurality of ball members supported by said inner assembly in a surrounding relationship about said piston member; and a ball member receiving means formed in said outer assembly for receiving at least a portion of said ball members, said receiving means including an inwardly tapered contact surface;

wherein said piston member includes a ball member displacement means for displacing said ball members in a radial direction into contact with said contact surface of said receiving means when said piston member is moved to the locking position, said displacement means including a first tapered working surface, a cylindrical contact surface extending axially from a radially inward portion of said first tapered working surface and a second tapered working surface extending inwardly from said cylindrical contact surface, said second tapered working surface having an angle of inclination in the axial direction greater than the angle of inclination in the axial direction of said first tapered working surface.

2. The apparatus of claim 1, wherein the angle of inclination in the axial direction of said first tapered working surface is about 15° and the angle of inclination in the axial direction of said second tapered working surface is about 30°.

3. The apparatus of claim 1, wherein said piston member includes a first part of large diameter, a second part including said tapered working surfaces and an intermediate part of small diameter interconnecting said first part and said second part.

* * * * *